(12) United States Patent
Graf et al.

(10) Patent No.: US 8,901,213 B2
(45) Date of Patent: Dec. 2, 2014

(54) AQUEOUS COATING COMPOSITIONS INCLUDING PHENYLPHENOL ETHOXYLATE SURFACTANTS

(71) Applicant: Dow Global Technologies LLC, Midland, MI (US)

(72) Inventors: Irina V. Graf, Midland, MI (US); Arkady L. Krasovskiy, Midland, MI (US); Cynthia L. Rand, Sanford, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/863,675

(22) Filed: Apr. 16, 2013

(65) Prior Publication Data

US 2013/0280433 A1 Oct. 24, 2013

Related U.S. Application Data

(60) Provisional application No. 61/625,747, filed on Apr. 18, 2012.

(51) Int. Cl.
| | |
|---|---|
| *C08K 3/02* | (2006.01) |
| *C08K 5/13* | (2006.01) |
| *C09D 7/12* | (2006.01) |
| *C09D 171/02* | (2006.01) |

(52) U.S. Cl.
CPC ............. *C09D 7/1233* (2013.01); *C09D 171/02* (2013.01)
USPC ............................................. 524/80; 524/339

(58) Field of Classification Search
USPC .......................................................... 524/80
See application file for complete search history.

(56) References Cited

U.S. PATENT DOCUMENTS

| | | | |
|---|---|---|---|
| 2,140,824 | A | 12/1938 | Vernon |
| 5,035,785 | A | 7/1991 | Debroy et al. |
| 2003/0078305 | A1 | 4/2003 | Meier et al. |
| 2003/0229171 | A1 | 12/2003 | Zhao et al. |

FOREIGN PATENT DOCUMENTS

| | | | | |
|---|---|---|---|---|
| CN | 1760330 | A | 4/2006 | |
| EP | 1184402 | A2 | 3/2002 | |
| EP | 2657271 | A1 | 10/2013 | |
| GB | 833612 | A | 4/1960 | |
| GB | 1047037 | A | 11/1966 | |
| JP | 49108132 | * | 10/1974 | ............... C09D 9/00 |
| JP | 11343420 | A | * 12/1999 | ............ C08L 101/00 |
| WO | 2007117512 | A1 | 10/2007 | |
| WO | 2009023171 | A1 | 2/2009 | |
| WO | 2009091592 | A1 | 7/2009 | |
| WO | 2010082918 | A1 | 7/2010 | |

OTHER PUBLICATIONS

Abstract of JP49108132, Oct. 15, 1974.*

* cited by examiner

*Primary Examiner* — Hui Chin
(74) *Attorney, Agent, or Firm* — Karl E. Stauss; Ronald D. Bakule

(57) ABSTRACT

An aqueous coating composition including an aqueous polymeric dispersion and from 0.1% to 40% by weight, based on the weight of the aqueous polymeric dispersion solids, Phenylphenol-$(CH_2CH_2O)_{2-50}H$, isomers thereof, aromatic ring substituted analogs thereof, and mixtures thereof is provided. Also provided are a method for forming a coating therefrom, a method for improving the freeze-thaw stability of an aqueous coating including a polymeric dispersion and alternative uses for Phenylphenol-$(CH_2CH_2O)_{2-50}H$, isomers thereof, aromatic ring substituted analogs thereof, and mixtures thereof.

5 Claims, No Drawings

AQUEOUS COATING COMPOSITIONS INCLUDING PHENYLPHENOL ETHOXYLATE SURFACTANTS

This invention relates to uses for low and zero VOC surfactant compositions. This invention particularly relates to Phenylphenol-$(CH_2CH_2O)_{2-50}H$, isomers thereof, aromatic ring substituted analogues thereof, and mixtures thereof for use, inter alia, as additives for aqueous polymeric dispersions and compositions including them.

Surfactants are typically added to compositions such as, for example, emulsion polymers and waterborne paints or coatings that include aqueous dispersions of polymers to function as emulsifiers, pigment dispersants, wetting agents, open time additives, and as freeze/thaw additives. The phenylphenol ethoxylate surfactants are, importantly non-alkylphenol ethoxylates (APEO) and are potentially zero-VOC materials.

Volatile organic compound (VOC) emissions contribute to the creation of ozone, a main constituent of smog. In the US, VOC regulations established by the US Environmental Protection Agency (EPA) and enforced at the state level dictate the maximum concentration of volatile solvents in paints, clean up solvents, and other products. In Europe, VOC limits are defined by the 2004/42/EC Solvents Directive for Decorative Paints. VOC regulations and prohibitions against the use of APEO materials have become more and more stringent and have affected the use of available surfactants.

The present invention serves to provide low or zero VOC compositions including phenylphenol ethoxylates that are suitable for use in numerous compositions, particularly in compositions that include aqueous polymeric dispersions such as, for example, decorative and protective coatings for various substrates.

Great Britain U.S. Pat. No. 1,047,037 discloses the treatment of certain textile fibers and polymeric sheet materials with surfactants including certain phenylphenol ethoxylates. There continues to be a need for low and no VOC surfactants for other uses, particularly those that include aqueous polymeric dispersions.

In a first aspect of the present invention there is provided an aqueous coating composition comprising an aqueous polymeric dispersion and from 0.1% to 40% by weight, based on the weight of said aqueous polymeric dispersion solids, Phenylphenol-$(CH_2CH_2O)_{2-50}H$, isomers thereof, aromatic ring substituted analogues thereof, and mixtures thereof.

In a second aspect of the present invention there is provided a method for forming a coating comprising (a) forming said aqueous coating composition of the first aspect of the present invention; (b) applying said aqueous coating composition to a substrate; and (c) drying, or allowing to dry, said applied aqueous coating composition.

In a third aspect of the present invention there is provided a method for improving the freeze/thaw stability of an aqueous composition comprising an aqueous polymeric dispersion by adding from 0.1% to 40% by weight, based on the weight of said aqueous polymeric dispersion solids, Phenylphenol-$(CH_2CH_2O)_{2-50}H$, isomers thereof, aromatic ring substituted analogues thereof, and mixtures thereof.

In a fourth aspect of the present invention there is provided a composition comprising from 0.1% to 40% by weight, based on the weight of said composition, Phenylphenol-$(CH_2CH_2O)_{2-50}H$, isomers thereof, aromatic ring substituted analogues thereof, and mixtures thereof; said composition being selected from the group consisting of metal working fluids, oil and gas recovery formulations, detergents, and emulsifiers.

The present invention relates to an aqueous coating composition including an aqueous polymeric dispersion and from 0.1% to 40% by weight, based on the weight of the aqueous polymeric dispersion solids, Phenylphenol-$(CH_2CH_2O)_{2-50}H$, isomers thereof, aromatic ring substituted analogues, and mixtures thereof.

The aqueous coating composition includes from 0.1% to 40%, preferably from 0.1% to 30%, and more preferably from 0.5% to 20%, by weight based on the weight of the aqueous polymeric dispersion solids, Phenylphenol-$(CH_2CH_2O)_{2-50}H$, isomers thereof, aromatic ring substituted analogues thereof, and mixtures thereof. By "Phenylphenol-$(CH_2CH_2O)_{2-50}H$" herein is meant the ethoxylates(2-50) of phenylphenol, the product being a phenylphenoxy ethoxylate (2-50)-H. By "isomers thereof" herein is meant that the phenyl ring may be attached to any of the available positions on the phenoxy ring. By "aromatic ring substituted analogues" herein is meant that either the phenyl or the phenoxy ring may, independently, bear none or one or more substituents. Preferred substituents are any linear or branched $C_1$-$C_{20}$ alkyl-, aromatic-, alkoxy- or aryloxy-, and halogen groups. More preferred substituents are any linear or branched $C_1$-$C_{10}$ alkyl-, phenyl-, alkoxy-, and chloro- or fluoro-groups.

The phenylphenol precursors may be prepared in various ways known in the art. 2-Phenylphenol was produced as a by-product of the alkali hydrolysis of chlorobenzene for the synthesis of phenol or diphenyl oxide. 4-phenylphenol is a byproduct in the industrial production of diphenyl oxide, produced by caustic hydrolysis of chlorobenzene under high temperature and high pressure conditions. Processes for producing 2-phenylphenol have been developed in which cyclohexanone dimer or 2-cyclohexylphenol is catalytically dehydrogenated, using a catalyst containing copper, nickel, aluminum and chromium and at least one of alkali sulfates and alkali carbonates; catalyst comprised of palladium or platinum supported on alumina or activated carbon; or a catalyst comprised of platinum and a hydroxide, oxide or carbonate of sodium or potassium supported on alumina or silica-alumina carrier.

Selected phenylphenol compositions are typically subjected to an alkoxylation reaction to provide Phenylphenol-$(CH_2CH_2O)_{2-50}H$, preferably Phenylphenol-$(CH_2CH_2O)_{7-30}H$, and more preferably Phenylphenol-$(CH_2CH_2O)_{10-25}H$, isomers thereof, aromatic ring substituted analogues thereof, and mixtures thereof. The alkoxylation reaction may be conducted in or without solvent. The solvent can be any solvent known to be used in alkoxylation reactions. It is preferable if the solvent can solubilize the phenylphenol. Examples of solvents include dimethoxyethane and toluene. Preferably 2-, 3-, or 4-Phenylphenols or any mixtures thereof can be used as initiators.

A catalyst is necessary for the ring opening reaction of ethylene oxide and can be any catalyst useful for such reactions, as is known in the art. Examples include but are not limited to KH, KOH, NaOH, DCM, $BF_3$, $Al(OTf)_3$, $Bi(OTf)_3$, tertiary amines or any mineral or solid supported acid. Preferred catalysts are potassium hydroxide, potassium hydride, DMC, sulfuric acid.

The Phenylphenol-$(CH_2CH_2O)_{2-50}H$ are desirably less than 10% volatile by Method 24, preferably less than 5% volatile, and most preferably less than 1% volatile to be useful as low VOC coalescing aids in the U.S. To be classified as VOC-exempt in the EU, the solvents must boil above 250° C. and preferably above 280° C.

The aqueous coating composition of the present invention includes an aqueous polymeric dispersion and from 0.1% to 40% by weight, based on the weight of aqueous polymeric dispersion solids, of Phenylphenol-$(CH_2CH_2O)_{2-50}H$. Typically, the calculated Tg of the aqueous polymeric dispersion is from −25° C. to 110° C. "Calculated Tg" of the polymers herein are those calculated using the Fox equation (T. G. Fox, *Bull. Am. Physics Soc.*, Volume 1, Issue No. 3, p. 123 (1956)). That is, for example, for calculating the Tg of a copolymer of monomers M1 and M2, $1/Tg(\text{calc.})=w(M1)/Tg(M1)+w(M2)/Tg(M2)$, wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The aqueous polymeric dispersion may be a dispersion of a polymer, oligomer, or prepolymer in an aqueous medium. In some embodiments the aqueous polymeric dispersion may be reactive before, during, or subsequent to film formation. By "aqueous medium" is meant herein a medium including at least 50%, by weight based on the weight of the medium, water. Typical aqueous polymeric dispersions are aqueous dispersions of epoxies, urethanes, acrylic polyols, polyesters, and hybrids of these and other chemistries; and emulsion polymers. The emulsion polymer typically includes at least one addition copolymerized ethylenically unsaturated monomer such as, for example, styrene or substituted styrenes; vinyl toluene; butadiene; (meth)acrylonitrile; a (meth)acrylic ester monomer such as, for example, methyl (meth)acrylate, ethyl (meth)acrylate, butyl (meth)acrylate, hydroxyethyl (meth)acrylate, hydroxypropyl (meth)acrylate, and ureido-functional (meth)acrylates; vinyl acetate or other vinyl esters; vinyl monomers such as vinyl chloride, vinylidene chloride, and N-vinyl pyrrolidone. The use of the term "(meth)" followed by another term such as (meth)acrylate, as used throughout the disclosure, refers to both acrylates and methacrylates.

In certain embodiments the emulsion polymer includes from 0% to 6%, or in the alternative, from 0% to 3 wt % or from 0% to 1%, by weight based on the weight of the polymer, of a copolymerized multi-ethylenically unsaturated monomer. It is important to select the level of multi-ethylenically unsaturated monomer so as to not materially interfere with film formation and integrity. Multi-ethylenically unsaturated monomers include, for example, allyl (meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The emulsion polymer includes from 0% to 15%, preferably from 0.5% to 5%, of a copolymerized monoethylenically-unsaturated acid monomer, based on the weight of the polymer. Acid monomers include carboxylic acid monomers such as, for example, (meth)acrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

The aqueous emulsion polymer is typically formed by an addition polymerization emulsion polymerization process as is known in the art.

Conventional surfactants and blends may be used including, for example, anionic and/or nonionic emulsifiers such as, for example, alkali metal or ammonium alkyl sulfates, alkyl sulfonic acids, fatty acids, and oxyethylated alkyl phenols, and mixtures thereof. Polymerizable surfactants that include at least one ethylenically unsaturated carbon-carbon bond which can undergo free radical addition polymerization may be used. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymer. The monomer mixture may be added neat or as an emulsion in water. The monomer mixture may be added in a single addition or more additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to the monomer addition. Processes yielding polymodal particle size distributions such as those disclosed in U.S. Pat. Nos. 4,384,056 and 4,539,361, for example, may be employed. The emulsion polymer may be formed in a multi-stage emulsion polymerization process as are well known in the art. The emulsion polymer is also contemplated to be formed in two or more stages, the stages differing in molecular weight. Blending two different emulsion polymers is also contemplated.

The average particle diameter of the emulsion polymer particles is typically from 40 nm to 1000 nm, preferably from 40 nm to 350 nm. Particle diameters herein are those measured by dynamic light scattering on a Brookhaven BI-90 Plus particle size analyzer.

The aqueous coating composition of the invention is prepared by techniques which are well known in the coatings art. The Phenylphenol-$(CH_2CH_2O)_{2-50}H$, isomers thereof, aromatic ring substituted analogues thereof, and mixtures thereof can be added to the coating composition at multiple points during the binder synthesis and formulation process. This includes before emulsion polymerization, during emulsion polymerization, after emulsion polymerization, to the grind, during the coating formulation, or to the fully formulated coating composition.

First, pigment(s), if any, are well dispersed in an aqueous medium under high shear such as is afforded by a COWLES™ mixer or predispersed colorant(s), or mixtures thereof are used. Then the emulsion polymer is added under low shear stirring along with the coalescent composition and other coatings adjuvants as desired. The aqueous coating composition may include, in addition to the aqueous polymeric dispersion and optional pigment(s), conventional coatings adjuvants such as, for example, extenders, emulsifiers, coalescing agents other than the coalescent composition of the present invention, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, and water-repellants.

Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilcates; silica; various clays such as kaolin and delaminated clay; and lead oxide. It is also contemplated that the aqueous coating composition may also contain opaque polymer particles, such as, for example, Ropaque™ Opaque Polymers (The Dow Chemical Co.).

The amounts of pigment and extender in the aqueous coating composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The aqueous coating composition herein expressly includes architectural, maintenance, and industrial coatings, caulks, sealants, and adhesives. The pigment volume concentration is calculated by the following formula:

$$PVC(\%) = \frac{\text{volume of pigment(s)}, +\text{volume extender(s)} \times 100.}{\text{total dry volume of paint}}$$

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

In the method for forming a coating of the invention the aqueous coating composition is typically applied to a substrate such as, for example, wood, metal, plastics, marine and civil engineering substrates, cementitious substrates such as, for example, concrete, stucco, and mortar, previously painted or primed surfaces, and weathered surfaces. The aqueous coating composition may be applied to a substrate using conventional coatings application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray.

Drying of the aqueous coating composition to provide a coating may be allowed to proceed under ambient conditions such as, for example, at 5° C. to 35° C. or the coating may be dried at elevated temperatures such as, for example, from 35° C. to 150° C.

In the method for improving the freeze/thaw stability of an aqueous composition including an aqueous polymeric dispersion of the present invention from 0.1% to 40%, preferably from 0.2% to 20%, and more preferably from 0.3% to 5%. by weight, based on the weight of the aqueous polymeric dispersion solids, Phenylphenol-$(CH_2CH_2O)_{2-50}H$, isomers thereof, aromatic ring substituted analogues thereof, and mixtures thereof is added. It is contemplated that that the Phenylphenol-$(CH_2CH_2O)_{2-50}H$, isomers thereof, aromatic ring substituted analogues thereof, and mixtures thereof may be added, all or in part, separately, in a mixture with other coatings adjuvants, or as a surfactant for the aqueous polymeric dispersion.

The invention in some of its embodiments will now be further described by reference to the following examples:

EXAMPLE 1

Ethoxylation of 2-phenylphenol

2-Phenylphenol (1.0 mmol), KH (ca. 2-3 mg) and dimethoxyethane (1 mL) were loaded into glass PPR vials prior to insertion into the PPR. The reaction was carried out in a Symyx PPR® (Parallel Pressure Reactor). Ethylene oxide was delivered via an Isco syringe pump equipped with a robotically-controlled needle and compressed gas microvalve connected to the Cavro robot arm inside the PPR glove box. The insert was loaded into each PPR well, pressurized with nitrogen to 50 psi. EO was introduced at 110° C. and the reaction was stirred for 3 hr at that temperature. Resulting viscous surfactants were tested for their properties without additional purification.

EXAMPLE 2

Surfactant Characterization

Selected representatives of surfactants synthesized as described in Example 1 were characterized for surfactant properties such as equilibrium and dynamic surface tension, substrate wetting (contact angle) and foaming properties. Properties were determined for 0.1 wt % aqueous surfactant solutions at ambient temperature.

The equilibrium surface tension of a surfactant solution was measured using a Kruss K100 Surface Tensiometer fitted with a Wilhelmy platinum plate. A standard method was utilized. Five measurements were made for each system at ambient temperature.

Dynamic surface tension was measured using a Hamilton Microstar formulator. During the test, air was dispensed into the vial containing the surfactant solution at a predetermined rate through disposable tips (radius: 0.223 mm), and the instrument recorded pressure changes. From the pressure data collected, bubble rate and maximum pressure values were determined, and dynamic surface tension was then estimated.

Contact angle measurements were performed at ambient temperature utilizing a VCA Optima XE instrument and corresponding software. The contact angle measurements were performed on a static sessile (i.e., sitting) drop. Five drops of surfactant solution were tested. For each drop, 1 µL of surfactant solution was deposited on the substrate using the syringe in the syringe assemble, an image of the drop on the substrate was recorded immediately after drop placement, and the left and right contact angles were calculated. The final contact angle reported was the average of the left and right contact angles for five drops. Teflon™ tape was used as a substrate. Teflon™ tape was carefully placed on a glass microscope slide using a small amount of adhesive on each edge of the microscope slide to hold the Teflon™ tape on the surface.

The foam test was conducted at ambient temperature. During the test, a 1 ml vial containing 0.5 ml of surfactant solution was shaken using a wrist shaker. For each vial, images were collected via a camera: prior to shaking and immediately after shaking. The images were analyzed to determine the ratio of height of the foam layer to the height of the liquid.

Average degree of ethoxylation for the Phenylphenol-$(CH_2CH_2O)_{2-50}H$ surfactants herein was based on $H^1$NMR spectra analysis by calculating relative integral ratio between protons in the aromatic region (6.95-7.60 ppm) and the protons of $CH_2$ groups (3.55-4.15 ppm).

Testing results are summarized in Table 2.1 and compared to values obtained for a commercial additive Rhodoline™ FT-100 (Rhodia, Inc.). The surfactants showed faster surface tension reduction under equilibrium and dynamic conditions, superior to that of Rhodoline™ FT-100, with similar wetting and foaming characteristics.

TABLE 2.1

Surfactant properties of selected alkoxylates.

| Surfactant | Number of EO units | Equilibrium Surface Tension, dynes/cm | Dynamic Surface Tension at 6 bubbles/sec, dynes/cm | Foam to liquid ratio @0 min. | Contact Angle on Teflon™ deg. |
|---|---|---|---|---|---|
| Ethoxylated 2-Phenylphenol | 11.7 | 43 | 57 | 0.34 | 89 |
| Ethoxylated 2-Phenylphenol | 16.4 | 47 | 59 | 0.31 | 88 |
| Ethoxylated 2-Phenylphenol | 18.4 | 48 | 59 | 0.35 | 92 |
| Rhodoline™ FT-100 (Comp.) | 8.5 | 62 | 70 | 0.24 | 84 |

EXAMPLE 3

Freeze-Thaw Stability of Acrylic Paint

Several selected phenylphenol alkoxylated surfactants synthesized as described in Example 1 were tested as freeze-thaw additives in an aqueous coating compositions including the aqueous polymeric dispersion Rhoplex™VSR-2015 (calculated Fox Tg=−3.7° C.), and stability of the aqueous coating compositions was compared to comparative aqueous coating compositions containing Rhodoline™ FT-100. The following protocol was used. For 1 wt % additive concentration, 0.060 g of freeze-thaw additive, 0.24 g of water, and 6.8 g of Rhoplex™VR-2015 were combined in a glass vial. For 0.5 wt % additive concentration, 0.030 g of freeze-thaw additive, 0.27 g of water, and 6.8 g of Rhoplex™VR-2015 were combined in a glass vial. In case of no additive, 0.3 g of water was added to 6.8 g of Rhoplex™VR-2015. The vial was mixed for 4 minutes at 750 rpm using overhead mixer with a Cowles blade impeller. The paint formulation was stored for 24 hours. The initial formulation viscosity was measured. The vials were placed in a freezer at 0(+−1.5)° C. for 12 hours. The vials were then taken out of the freezer and kept at ambient temperature for 24 hours. The samples were evaluated for failure visually and viscosity was measured.

TABLE 3.1

Freeze-Thaw performance of selected surfactants.

| Surfactant | # EO units | Viscosity after 3 FT Cycles, cPs; @1 wt. % | Viscosity after 3 FT Cycles, cPs; @ 0.5 wt. % |
|---|---|---|---|
| Ethoxylated 2-Phenylphenol | 11.7 | 2276 | 3303 |
| Ethoxylated 2-Phenylphenol | 16.4 | 2176 | 1544 |
| Ethoxylated 2-Phenylphenol | 18.4 | 853.4 | 2364 |
| Ethoxylated 4-Phenylphenol | 10.9 | 1110 | 2545 |
| Ethoxylated 4-Phenylphenol | 15.75 | 1599 | 2372 |
| Rhodoline™ FT-100 (Comp.) | 8.5 | 1617 | 4624 |
| None (Comp.) | — | Failed after first cycle | Failed after first cycle |

The evaluation of selected phenylphenol ethoxylated surfactants as freeze-thaw additives in a low VOC aqueous coating composition of the invention showed that at 1 wt. % concentration, the surfactants provided freeze-thaw stability to the aqueous coating compositions of the invention after three freeze-thaw cycles, with final coating composition viscosity similar to that of the comparative aqueous coating composition containing commercial product Rhodoline™ FT-100. Notably, At 0.5% concentration the tested materials provided freeze-thaw stability to both aqueous coating compositions after three freeze-thaw cycles, with final aqueous coating composition viscosity similar or better than that of the comparative aqueous coating composition containing commercial product Rhodoline™ FT-100.

What is claimed is:

1. An aqueous coating composition comprising an aqueous polymeric dispersion and from 0.1% to 40% by weight, based on the weight of said aqueous polymeric dispersion solids, phenylphenol-$(CH_2CH_2O)_{7-30}H$, isomers thereof, aromatic ring substituted analogues thereof, and mixtures thereof; wherein said aqueous polymeric dispersion is selected from the group consisting of an epoxy emulsion, an aqueous emulsion polymer comprising from 0% to 6%, by weight based on the weight of the polymer, of a copolymerized multi-ethylenically unsaturated monomer, and a multistage emulsion polymer having, when dry, a void therein.

2. The aqueous coating composition of claim 1 wherein said coating composition comprises from 0.5% to 20% by weight, based on the weight of said aqueous polymeric dispersion solids, phenylphenol-$(CH_2CH_2O)_{7-30}H$, isomers thereof, aromatic ring substituted analogues thereof, and mixtures thereof.

3. A method for forming a coating comprising
 (a) forming said aqueous coating composition of claim 1;
 (b) applying said aqueous coating composition to a substrate; and
 (c) drying, or allowing to dry, said applied aqueous coating composition.

4. A method for improving the freeze/thaw stability of an aqueous composition comprising an aqueous polymeric dispersion by adding from 0.1% to 40% by weight, based on the weight of said aqueous polymeric dispersion solids, phenylphenol-$(CH_2CH_2O)_{7-30}H$, isomers thereof, aromatic ring substituted analogues thereof, and mixtures thereof; wherein said aqueous polymeric dispersion is selected from the group consisting of an epoxy emulsion, an aqueous emulsion polymer comprising from 0% to 6%, by weight based on the weight of the polymer, of a copolymerized multi-ethylenically unsaturated monomer, and a multistage emulsion polymer having, when dry, a void therein.

5. A composition comprising from 0.1% to 40% by weight, based on the weight of said composition, phenylphenol-$(CH_2CH_2O)_{7-30}H$, isomers thereof, aromatic ring substituted analogues thereof, and mixtures thereof, said composition being selected from the group consisting of metal working fluids, oil and gas recovery formulations, and detergents.

* * * * *